(12) United States Patent
Ban et al.

(10) Patent No.: US 8,014,899 B2
(45) Date of Patent: Sep. 6, 2011

(54) ARTICLE CONVEYING ROBOT SYSTEM

(75) Inventors: Kazunori Ban, Yamanashi (JP); Ichiro Kanno, Yamanashi (JP); Fumikazu Warashina, Yamanashi (JP); Masafumi Ooba, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/768,868

(22) Filed: Apr. 28, 2010

(65) Prior Publication Data
US 2010/0305754 A1 Dec. 2, 2010

(30) Foreign Application Priority Data
Jun. 2, 2009 (JP) ................................. 2009-133302

(51) Int. Cl.
G06F 19/00 (2006.01)
G06F 7/00 (2006.01)
B65G 43/10 (2006.01)
(52) U.S. Cl. ........ 700/248; 700/213; 700/230; 700/245; 700/259; 198/340; 198/395
(58) Field of Classification Search .......................... None
See application file for complete search history.

(56) References Cited

U.S. PATENT DOCUMENTS

| | | | | | |
|---|---|---|---|---|---|
| 4,692,876 | A | * | 9/1987 | Tenma et al. | 700/249 |
| 5,475,797 | A | * | 12/1995 | Glaspy et al. | 700/247 |
| 6,035,243 | A | * | 3/2000 | Galuga et al. | 700/110 |
| 6,516,234 | B2 | * | 2/2003 | Kamiguchi et al. | 700/20 |
| 6,579,053 | B1 | * | 6/2003 | Grams et al. | 414/269 |
| 6,826,444 | B2 | * | 11/2004 | Herzog | 700/213 |
| 6,892,890 | B2 | * | 5/2005 | Dominguez | 209/559 |
| 6,934,605 | B1 | * | 8/2005 | Dothan et al. | 700/245 |
| 2005/0107919 | A1 | * | 5/2005 | Watanabe et al. | 700/245 |
| 2006/0276934 | A1 | * | 12/2006 | Nihei et al. | 700/245 |
| 2007/0108109 | A1 | | 5/2007 | Erlandsson-Warvelin et al. | |
| 2008/0009972 | A1 | * | 1/2008 | Nihei et al. | 700/245 |
| 2009/0271034 | A1 | * | 10/2009 | Kalbavi et al. | 700/245 |
| 2010/0326893 | A1 | * | 12/2010 | Hueppi et al. | 209/645 |

FOREIGN PATENT DOCUMENTS

| | | |
|---|---|---|
| JP | 62-193787 A | 8/1987 |
| JP | 03-234491 A | 10/1991 |
| JP | 05-111888 A | 5/1993 |
| JP | 06-210556 A | 8/1994 |
| JP | 09-117883 A | 5/1997 |
| JP | 2001239484 A | 9/2001 |
| JP | 2002192846 A | 7/2002 |

(Continued)

Primary Examiner — Khoi Tran
Assistant Examiner — Bao Long Nguyen
(74) Attorney, Agent, or Firm — Lowe Hauptman Ham & Berner LLP

(57) ABSTRACT

An article conveying robot system capable of effectively containing an article in a container conveyed by a conveyor by using a robot. A container detecting part measures the distribution of shading of an image of each containing cell based on a detection result of the container, detects the containing state of each cell, and stores the detection result of each cell. An information managing part of a controller of an upstream side robot receives information from a container detecting part of a controller of a downstream side robot, and then generates containing cell information. An information managing part checks the cell information to be processed, and then transmits the cell information to a task executing part only when an article is not located in the corresponding cell. Task executing part controls the robot so as to locate an article in the selected cell based on the cell information.

12 Claims, 7 Drawing Sheets

FOREIGN PATENT DOCUMENTS

| | | |
|---|---|---|
| JP | 2002-316716 A | 10/2002 |
| JP | 2003-211096 A | 7/2003 |
| JP | 2007-030087 A | 2/2007 |
| JP | 2007528793 T | 10/2007 |
| WO | 2004/113030 A1 | 12/2004 |

* cited by examiner

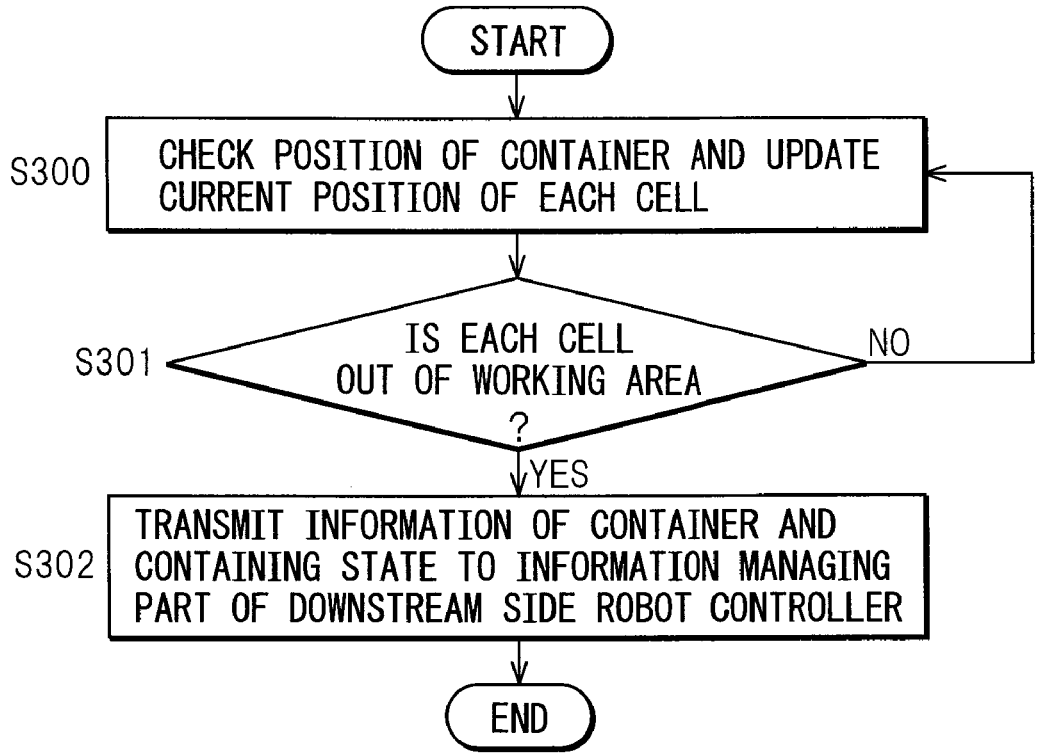
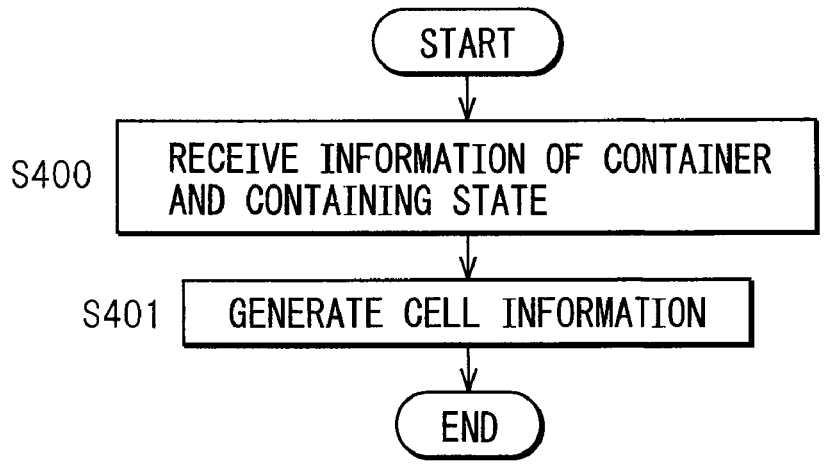

ARTICLE CONVEYING ROBOT SYSTEM

RELATED APPLICATIONS

The present application claims priority from Japanese Patent Application No. 2009-133302, filed on Jun. 2, 2009, the entire content of which is fully incorporated herein by reference.

BACKGROUND OF THE INVENTION

1. Field of the Invention

The present invention relates to a robot system for conveying an article using a robot.

2. Description of the Related Art

As a conveying robot system of the prior art having an industrial robot and a vision sensor, a system including a plurality of robots positioned along a conveying path of a conveyor is known. The robots are adapted to grip an article conveyed by the conveyor, and transport the article from the conveyor to another position or process. For example, Japanese Unexamined Patent Publication No. 2007-30087 discloses a system for detecting an article on a conveyor by using a vision sensor, and handling the detected article by using a plurality of robots. In this system, each robot judges whether the robot can handle the detected article or not, based on information regarding the position of the article and the number of articles to be handled. If one robot judges that the robot cannot handle an article, the robot transmits the article information to another robot on the downstream side thereof, and the robot on the downstream side handles the article. In other words, the invention of Japanese Unexamined Patent Publication No. 2007-30087 utilizes distributed control, wherein each robot controller determines which article of the detected articles should be handled by the corresponding robot.

On the other hand, International Publication No. WO2004/113030 discloses a central control, wherein one computer manages the handling process with a plurality of robots.

Although the objects to be handled in the above documents are individual articles, the above technique may be applied to a system wherein an article is contained in a container conveyed by a conveyer. However, if the above technique is applied to a system wherein a container on a conveyer has a plurality of containing segments for an article, when at least one of the containing segments is already occupied by the article, there the following problems.

It is necessary to detect each containing segment as one container. However, unlike the detection of each individual article, it is not easy to detect each containing segment in one container. In many cases, each containing segment is defined by a simple partition within a relatively large container. When an image obtained by a camera used as a sensor is processed, the feature of the image is likely to be insufficient (i.e., false-detection or misdetection may occur). In another case, a partition is not used and containing segments are conceptually defined (for example, a plurality of articles are positioned in one container in a "M-long, N-wide" configuration). In such a case, it is very difficult to detect each containing segment by a sensor.

Even if each segment can be detected, without a means for checking whether each segment is occupied by an article or not, a robot may position an article on a containing segment where another article has already been positioned. In order to avoid such a case, an operator may manually input which segment is occupied by an article. However, this is disadvantageous in view of laborsaving. As such, a system wherein a container has a plurality of segments for an article is difficult to be put to practical use.

SUMMARY OF THE INVENTION

Accordingly, it is an object of the present invention to provide an article conveying robot system capable of effectively containing an article in a container conveyed by a conveyor by using a robot.

According to the present invention, an article conveying robot system is provided comprising: a conveyor adapted to convey a container having a plurality of containing cells where an article is positioned; a plurality of robot mechanical units positioned along a conveying direction of the conveyor; a plurality of robot controllers connected to each other by means of a communication part, each robot controller adapted to control respective robot mechanical unit; and a sensor positioned on the upstream side of the conveying direction of the conveyor relative to a robot mechanical unit on the most upstream side of the conveying direction, the sensor adapted to detect the position or position-orientation of the container conveyed by the conveyor and a containing state of the article in the container, the robot controller being adapted to activate the robot mechanical unit based on the detection result of the sensor so as to locate the article in the container, wherein: at least a robot controller corresponding to the robot mechanical unit on the most upstream side comprises an information managing part adapted to previously store the position or the position-orientation of each containing cell in the container and calculate containing cell information including the position or the position-orientation of each containing cell relative to the conveyor and the containing state of each containing cell, based on the stored position or position-orientation of the plurality of containing cells in the container, the position or the position-orientation of the container obtained by the sensor, and the containing state of the article, a robot controller corresponding to the robot mechanical unit other than the robot mechanical unit on the most upstream side comprises a receiving part adapted to receive the containing cell information from a robot controller of an adjacent robot mechanical unit on the upstream side, via the communication part, in synchronization with the conveying motion of the conveyor, a robot controller corresponding to the robot mechanical unit other than the robot mechanical unit on the most downstream side comprises a transmitting part adapted to transmit the containing cell information to a robot controller of an adjacent robot mechanical unit on the downstream side, via the communication part, in synchronization with the conveying motion of the conveyor, and each robot controller corresponding to each of the plurality of robot mechanical units comprises a controlling part adapted to control respective robot mechanical unit, based on the containing cell information, so as to locate an article in a containing cell in relation to the containing cell information when the containing cell is not occupied by an article.

The present invention also provides an article conveying robot system comprising: a conveyor adapted to convey a container having a plurality of containing cells where an article is positioned; a plurality of robot mechanical units positioned along a conveying direction of the conveyor; a plurality of robot controllers connected to each other by means of a communication part, each robot controller adapted to control respective robot mechanical unit; and a sensor positioned on the upstream side of the conveying direction of the conveyor relative to a robot mechanical unit on the most upstream side of the conveying direction, the sensor adapted to detect the position or position-orientation of the container conveyed by the conveyor and a containing state of the article in the container, the robot controller being adapted to activate the robot mechanical unit based on the detection result of the sensor so as to locate the article in the container, wherein: each robot controller corresponding to each of the plurality of robot mechanical units comprises an information managing part adapted to previously store the position or the position-orientation of each containing cell in the container and calculate containing cell information including the position or the position-orientation of each containing cell relative to the conveyor and the containing state of each containing cell, based on the stored position or position-orientation of the plurality of containing cells in the container, the position or the position-orientation of the container obtained by the sensor, and the containing state of the article, a robot controller corresponding to the robot mechanical unit other than the robot mechanical unit on the most upstream side comprises a receiving part adapted to receive information including the position or the position-orientation of the container and the containing state of the article, from a robot controller of an adjacent robot mechanical unit on the upstream side, via the communication part, in synchronization with the conveying motion of the conveyor, a robot controller corresponding to the robot mechanical unit other than the robot mechanical unit on the most downstream side comprises a transmitting part adapted to transmit information including the position or the position-orientation of the container and the containing state of the article, to a robot controller of an adjacent robot mechanical unit on the downstream side, via the communication part, in synchronization with the conveying motion of the conveyor, and each robot controller corresponding to each of the plurality of robot mechanical units comprises a controlling part adapted to calculate containing cell information based on the position or the position-orientation of each containing cell in the container, the position or the position-orientation of the container and the containing state of the article, and control respective robot mechanical unit, based on the containing cell information, so as to locate an article in a containing cell in relation to the containing cell information when the containing cell is not occupied by an article.

The information managing part may updates the containing cell information when the corresponding robot mechanical unit has located an article in the containing cell.

It is preferable that the transmitting part transmits the containing cell information when a containing cell in relation to the containing cell information is moved outside of a predetermined operation area of the corresponding robot mechanical unit.

It is preferable that the transmitting part transmits the information including the position or the position-orientation of the container and the containing state of the article when the container in relation to the information of the position or the position-orientation of the container is moved outside of a predetermined operation area of the corresponding robot mechanical unit.

In a preferable embodiment, the sensor is constituted by a camera and an image processor which processes the image obtained by the camera, the image processor being built into one of the plurality of robot controllers.

In another preferable embodiment, the sensor is constituted by a camera and an image processor which processes the image obtained by the camera, the image processor being arranged separately from the plurality of robot controllers.

The present invention also provides an article conveying robot system comprising: a conveyor adapted to convey a container having a plurality of containing cells where an article is positioned; a plurality of robot mechanical units positioned along a conveying direction of the conveyor; a plurality of robot controllers connected to each other by means of a communication part, each robot controller adapted to control respective robot mechanical unit; and a sensor positioned on the upstream side of the conveying direction of the conveyor relative to a robot mechanical unit on the most upstream side of the conveying direction, the sensor adapted to detect the position or position-orientation of the container conveyed by the conveyor and a containing state of the article in the container, the robot controller being adapted to activate the robot mechanical unit based on the detection result of the sensor so as to locate the article in the container, wherein: at least a robot controller corresponding to the robot mechanical unit on the most upstream side comprises an information managing part adapted to previously store the position or the position-orientation of each containing cell in the container and calculate containing cell information including the position or the position-orientation of each containing cell relative to the conveyor and the containing state of each containing cell, based on the stored position or position-orientation of the plurality of containing cells in the container, the position or the position-orientation of the container obtained by the sensor, and the containing state of the article, a robot controller corresponding to the robot mechanical unit other than the robot mechanical unit on the most upstream side comprises a receiving part adapted to receive information in relation to the containing cell information from a robot controller of an adjacent robot mechanical unit on the upstream side, via the communication part, in synchronization with the conveying motion of the conveyor, a robot controller corresponding to the robot mechanical unit other than the robot mechanical unit on the most downstream side comprises a transmitting part adapted to transmit information in relation to the containing cell information to a robot controller of an adjacent robot mechanical unit on the downstream side, via the communication part, in synchronization with the conveying motion of the conveyor, and each robot controller corresponding to each of the plurality of robot mechanical units comprises a controlling part adapted to control a respective robot mechanical unit, based on the containing cell information, so as to locate an article in a containing cell in relation to the containing cell information when the containing cell is not occupied by an article.

BRIEF DESCRIPTION OF THE DRAWINGS

The above and other objects, features and advantages of the present invention will be made more apparent by the following description, of the preferred embodiments thereof, with reference to the accompanying drawings wherein:

FIG. 8 is a flowchart showing a process regarding transmitting of container information;

FIG. 9 is a flowchart showing a process regarding receiving of the container information and generating the containing cell information.

DETAILED DESCRIPTIONS

Figure 1:
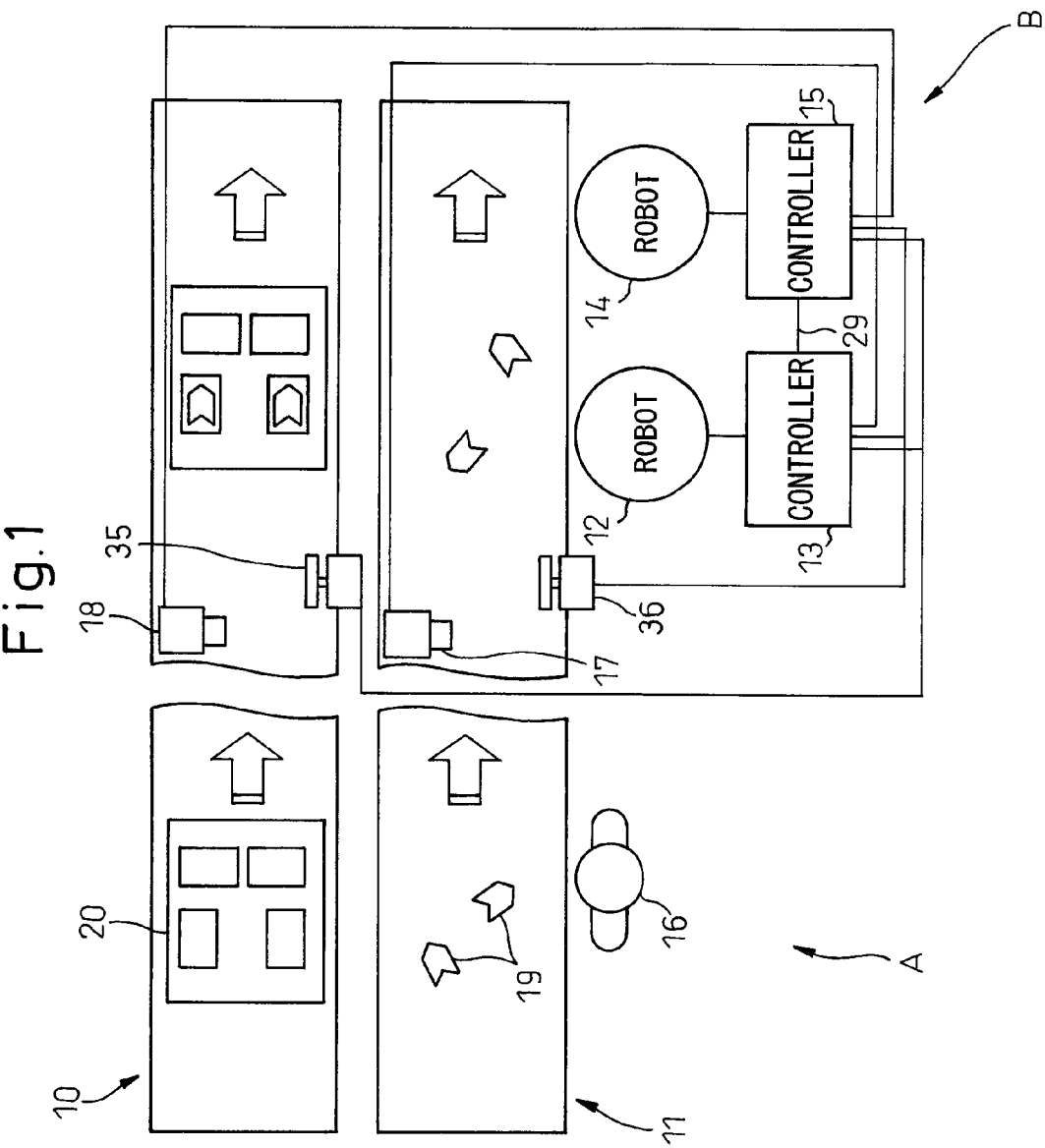
FIG. 1 shows an embodiment of a configuration of an article conveying robot system according to the present invention.

FIG. 1 shows one embodiment of an article conveying robot system 1 according to the present invention. Robot system 1 has a discharge conveyor 10 adapted to convey a container 20, and a supply conveyor 11 adapted to convey an article 19 (illustrated as an arrow shaped member in FIG. 1). Preferably, the two conveyors are adjacently positioned so that conveying directions thereof are parallel to each other. In a process for conveying member 19 from supply conveyor 11 to discharge conveyor 10, an operator 16 performs an upstream process "A" (on the left side of FIG. 1), and a plurality of (two in the embodiment) robots 12, 14 perform a downstream process "B."

In upstream process "A," operator 16 locates member 19 in a containing cell which is a part of container 20. On the other hand, in downstream process "B," a robot system including robots 12, 14 locates member 19 in a containing cell which is not occupied by a member. The present invention is intended to be used in the downstream process.

As shown in FIG. 1, robots 12, 14 are positioned along the conveying direction of supply conveyer 11. On the upstream side relative to the robot (robot 12 in the embodiment) on the upstream side, a camera 17 is positioned directly above supply conveyor 11 so as to detect the member. Camera 17 is connected to an image processor 60 (see FIG. 2) built into robot controller 13. Similarly, on the upstream side relative to the robot (robot 12 in the embodiment) on the upstream side, a camera 18 is positioned directly above discharge conveyor 10 so as to detect the container. Camera 18 is connected to an image processor built into robot controller 15. It is not necessary to built the image processor into the robot controller, otherwise, the image processor may be arranged separately from the robot controller. It is not necessary to use the conveyor to supply the member to the robot. For example, a relatively large box including many articles or members may be positioned near the robot. In addition, the position of camera 17, 18 is not limited to a place directly above the conveyor, as long as the camera can detect the member and the container.

Figure 2:
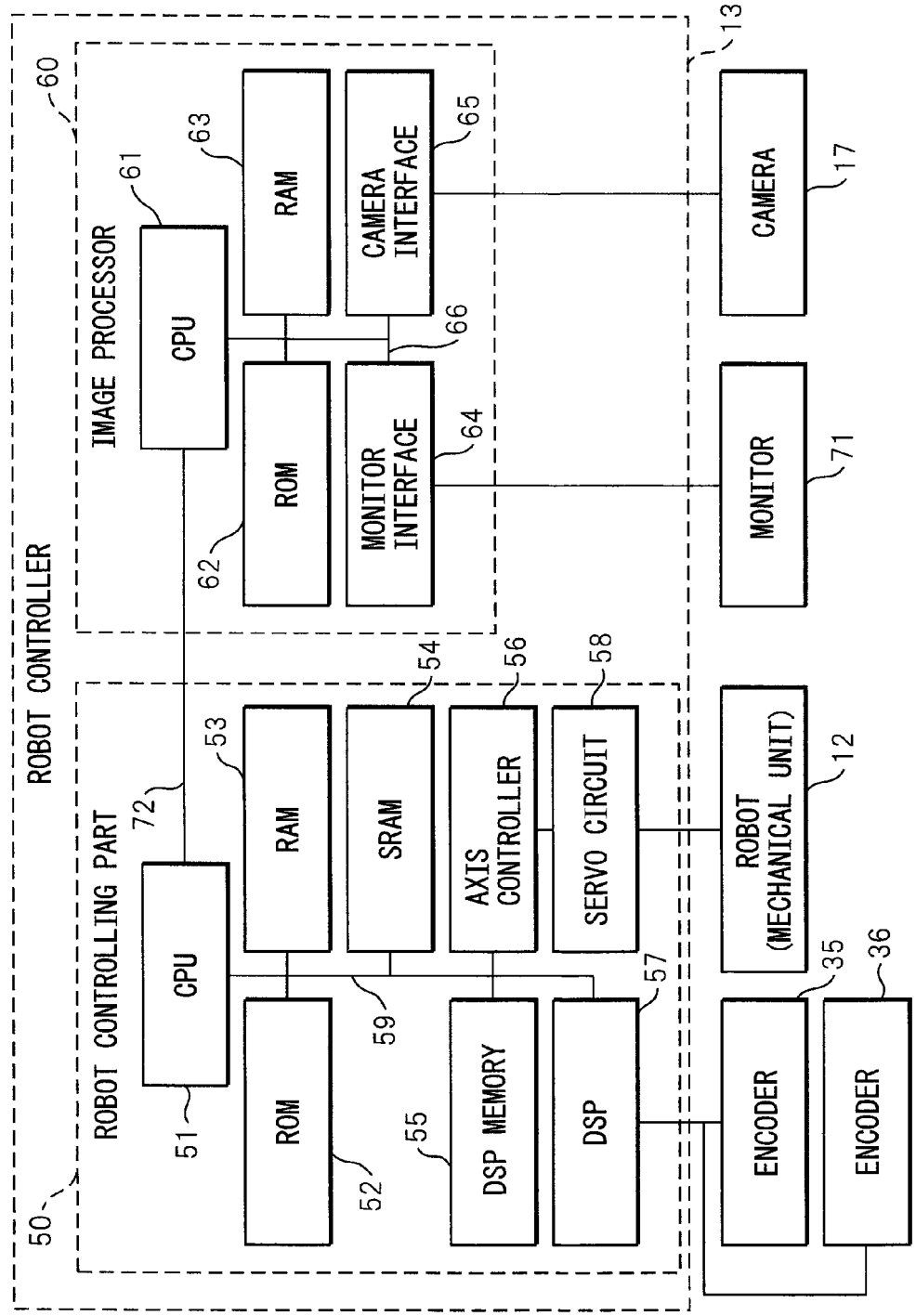
FIG. 2 shows an example of a configuration of hardware of a robot controller of FIG. 1.

FIG. 2 shows a configuration of hardware of robot controllers 13, 15. Robot controller 13 adapted to control robot 12 obtains information including the position or position-orientation of a member from image processor 60 built into robot controller 13. Similarly, robot controller 15 adapted to control robot 14 obtains information including the position or position-orientation of the container and the containing state of the member in the container (or how the member is contained in the container) from the image processor built into robot controller 15. As shown in FIG. 1, an encoder 36, adapted to detect the amount of belt movement of supply conveyor 11, is positioned on supply conveyor 11, and an output value of encoder 36 is input to robot controllers 13, 15. Similarly, an encoder 35, adapted to detect the amount of belt movement of discharge conveyor 10, is positioned on discharge conveyor 10, and an output value of encoder 35 is input to robot controllers 13, 15. Robot controllers 13, 15 use the output of encoders 35,36 so as to control the corresponding robot so that each robot performs a tracking motion. Robot controllers 13, 15 are connected to each other via a communication part, such as a communication line 29, whereby information regarding the member and the containing cell may be transmitted or received between the robot controllers. In addition, in the present invention, the term "position-orientation" means the position and the orientation (posture) of the member or article.

As shown in FIG. 2, image processor 60 built into robot controller 13 has a CPU 61 comprised of a microprocessor, a ROM 62, a RAM 63, a monitor interface 64 connected to a monitor 71, and a camera interface 65, which are connected to each other via a bus 66. Camera 17 is connected to camera interface 65, and an image obtained by camera 17 is stored in RAM 63. Data stored in RAM 63 is analyzed by CPU 61. ROM 62 stores various setting data regarding image processor 60 and an analysis program.

As shown in FIG. 2, CPU 61 of image processor 60 is connected to a CPU 51 of a robot control part 50 of robot controller 13 via a bus 72. Robot control part 50 has a ROM 52, a RAM 53, a SRAM 54, a digital signal processor (DSP) 57 and a data memory 55 for the DSP, which are connected to each other via a bus 59. ROM 52 stores a program for controlling the entire system, and RAM 53 temporarily stores data to be processed by CPU 51. SRAM 54 stores a motion program and/or setting data for robot 12. DSP 57 is a processor adapted to process output signals from encoders 35, 36, and DSP data memory 55 stores setting parameter and/or processed parameter of DSP 57. DSP 57 may detect the output from encoders 35, 36 according to a command from CPU 51, at a given point in time, and save the detected data in a certain area of DSP data memory 55. CPU 61 of image processor 60 may also access DSP data memory 55 via CPU 51 of robot control part 50.

Robot control part 50 has an axis controller 56 adapted to control robot 12 and connected to robot (mechanical unit) 12 via a servo circuit 58. Since the configuration of robot controller 15 adapted to control robot 14 may be the same as that of robot controller 13, the detailed explanation thereof is omitted.

Figure 3:
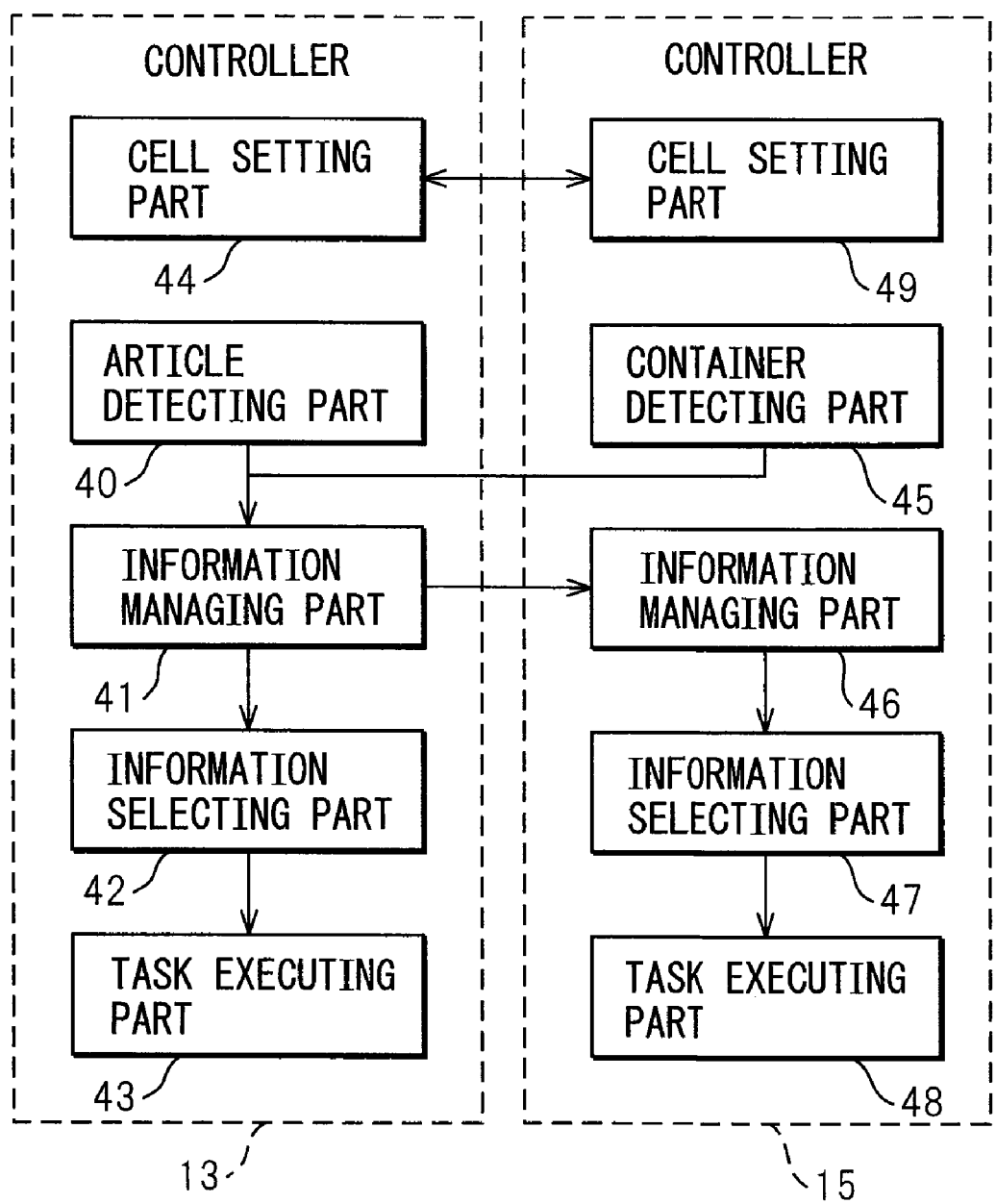
FIG. 3 is a functional block diagram of the robot controller of FIG. 1.

FIG. 3 is a block diagram indicating each process in robot controllers 13, 15, for treating information regarding the member and the containing cell. An arrow in FIG. 3 indicates the flow of information regarding the member and the containing cell. In the embodiment, handling of container 20 on discharge conveyor 10 is explained, and an explanation of article detecting part 40 adapted to detect the article on supply conveyor 11 is omitted. The handling of the article is generally the same as the handling of container 20.

As shown in FIG. 3, robot controllers 13, 15 have cell setting parts 44, 49, respectively. In each cell setting part, the position or the position-orientation of the plurality of containing cells in the container, where the member is positioned, is defined. Each position or position-orientation of containing cell, defined in one of robot controllers 13, 15, may be transmitted to the other robot controller via the communication part, whereby the same position or position-orientation is defined in the cell setting part of the other robot controller.

Figures 4, 5:
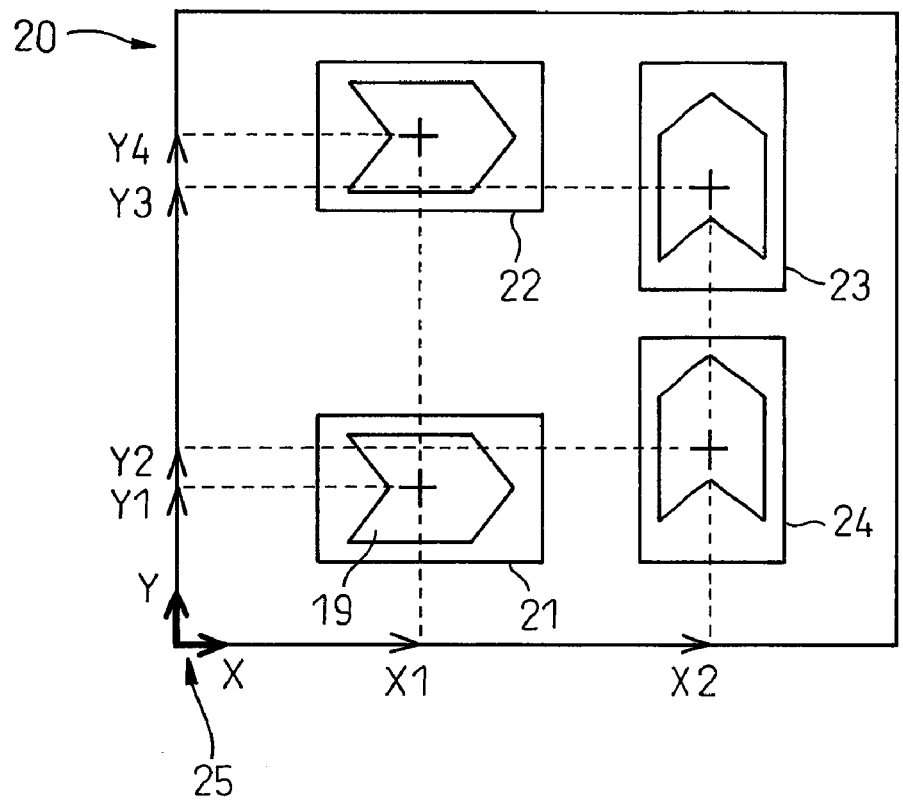
FIG. 4 is schematic diagram of a container.
FIG. 5 is a table showing an example of the position of each containing cell in the container.

FIG. 4 is a top view of container 20 viewed from directly above, a containing surface of which faces upward. In FIG. 4, the position of each containing cell 21-24 defined in container 20 of FIG. 1 is illustrated. The position or position-orientation of each containing cell is defined in relation to a container coordinate system 25 defined at an arbitrary point in container 20. A table of FIG. 5 shows the position or position-orientation of each containing cell of FIG. 4.

Characters X, Y in the table indicate X, Y coordinates of a representative point (for example, the center of gravity) of the member in each cell on container coordinate system 25, and a character R indicates an angle of the member in each containing cell. In other words, in the example of FIG. 4, the orientation of the members in cells 21, 22 is zero degree, and the orientation of the members in cells 23, 24 is 90 degrees in the counterclockwise direction relative to the members in cell 21, 22.

A container detecting part 45 as shown in FIG. 3 detects the container when the belt of the conveyor is moved a predetermined distance, or when an output from an external sensor, such as a phototube sensor, is inputted to container detecting part 45. As a method for detecting the container, many methods may be used, for example, a normalized correlation method wherein one image coinciding with a registered model image is detected from images obtained by a camera, or a general Hough transform method wherein an outline of an object is extracted from a registered model image and the position or position-orientation of the object on an image obtained by a camera is calculated based on the outline.

As a method for detecting the containing state of each containing cell (i.e., whether the member is positioned in each cell or not), many methods may be used, for example, a method for measuring the distribution of shading of a certain image area (or measurement area) in an image obtained by a camera, or a method for checking whether a member or an object is detected in a certain image area (or measurement area). In this regard, it is preferable that the measurement area is moved, depending on the detection result of the container, so that the measurement area always surrounds each containing cell.

In the embodiment, image processor 60 previously designates a measurement area in an image (then, information regarding the designation is stored in ROM 62 or the like), and the distribution of shading of the designated measurement area is measured when the image is processed. The designation of the measurement area may be automatically performed based on definition information 26 of the position of each containing cell, as shown in a table of FIG. 5 which indicates the relationship between the container and the containing cells of the container. Otherwise, an image obtained by camera 17 may include an image of the actual container, and the operator (or a person who sets up the system) may designate a measurement area corresponding to each containing cell in the image. The position or position-orientation of the measurement area may be dynamically changed corresponding to the detection result (the position or position-orientation) of the container in the image obtained by camera 17, whereby the distribution of shading in each containing cell may always be measured.

Figure 6:
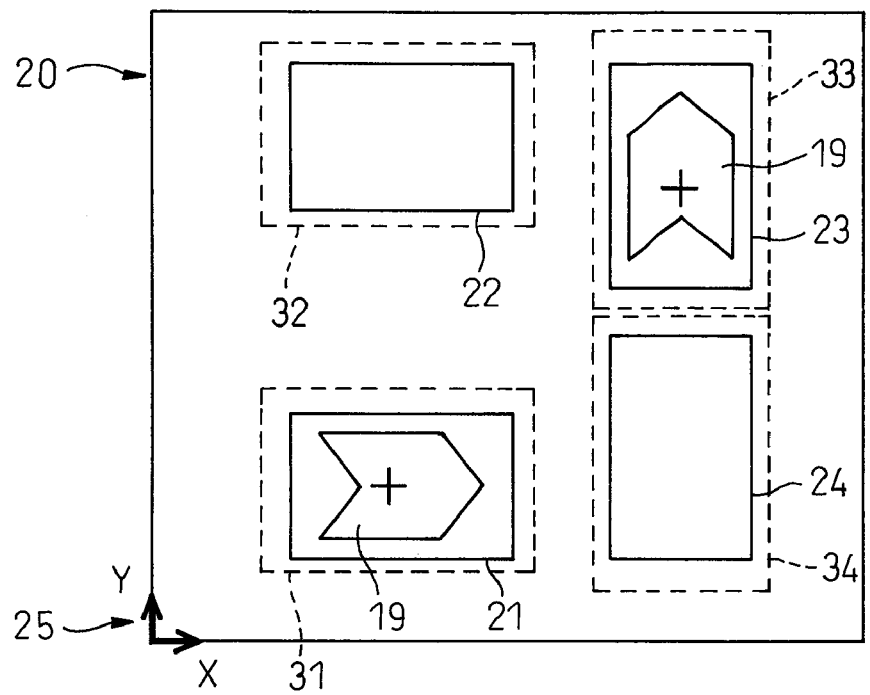
FIG. 6 is a diagram, similar to FIG. 4, showing an example wherein a member has been contained in some of the containing cells.

In FIG. 6, dotted lines indicate measurement areas 31 to 34, which are set in relation to containing cells 21 to 24, respectively. When container detecting part 45 of FIG. 3 detects the container from the input image, container detecting part 45 also calculates the position or position-orientation and the distribution of shading of measurement areas 31 to 34 based on the detection result. In one example, the distribution of shading varies depending on whether the member is contained in the containing cell or not. The containing state of each cell may be judged due to the change of the distribution of shading. In the case of FIG. 6, measurement areas 31, 33 contain member 19, and measurement areas 32, 34 do not contain member 19. Container detecting part 45 measures the distribution of shading of each containing cell based on the detection result of container 20, and detects the containing state of each containing cell.

Container detecting part 45 stores the detection result of the containing state of each containing cell. For example, container detecting part 45 uses a memory region (RAM 63 or the like) adapted to store data indicating the containing state of each containing cell 21-24 every when container 20 is detected, and each bit the memory region corresponds to each containing cell. For example, a first bit of the memory indicates the result of measurement area 31 which corresponds to containing cell 21. For example, if the first bit is equal to "1," an article is contained in the corresponding containing cell, and if the first bit is equal to "0," no article is contained in the corresponding containing cell.

When container 20 is successfully detected, container detecting part 45 transmits information to an information managing part 41 of controller 13, the information including the position or position-orientation of the container, the containing state of each containing cell of the container, and a value of encoder 35 of discharge conveyor 10 just when camera 17 captures the container, etc. Also, the detection result of the article by means of article detecting part 40 is transmitted to information managing part 41.

After receiving the above information from container detecting part 45 of controller 15, information managing part 41 of controller 13 generates containing cell information. Information managing part 41 previously stores the position of a container coordinate system 25 in container 20 and position information of each containing cell 21-24. Due to this stored data and the detection result of the position or position-orientation of container 20 from container detecting part 45, the position or position-orientation of each containing cell, when the container is detected, is calculated.

Information managing part 41 manages containing cell information, the containing cell information including the position or position-orientation of each containing cell associated with the information of the containing state of each containing cell received from container detecting part 45. Although the position or position-orientation of the container and the containing cell is represented as a value in a camera coordinate system defined in camera 17, when the positional relationship between the camera coordinate system and a robot coordinate system based on which the motion of the robot is determined, the position or position-orientation in the camera coordinate system may be converted to the position or position-orientation in the robot coordinate system by using a known coordinate-transform method. Further, when the robot coordinate system defined in each robot controller is configured so as to represent physically the same coordinate system, the position or position-orientation of the containing cell may be commonly used in all of the robot controllers.

Therefore, when the position or position-orientation of the containing cell is determined by image processor 60 or the like, at least one of robot controllers 13, 15 may control at least one of robot mechanical units 12, 14 such that the controlled robot may perform a task in relation to the containing cell.

Figure 7:
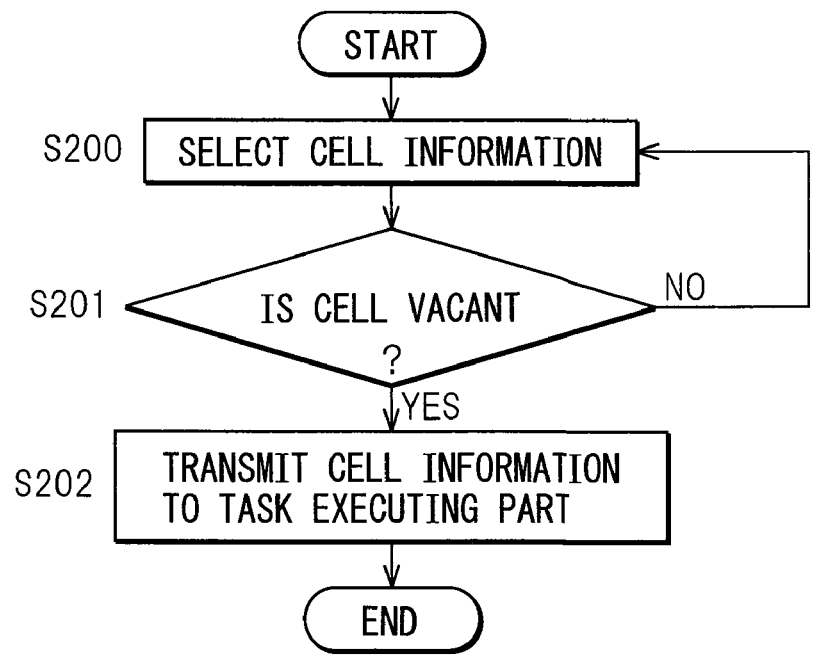
FIG. 7 is a flowchart showing a process regarding selecting and outputting of containing cell information.

FIG. 7 is a flowchart showing a procedure an information selecting part 42 of controller 13 selects containing cell information to be processed subsequently, and outputs the containing cell information to a task executing part 43 of controller 13. First, in step S200 of FIG. 7, information selecting part 42 selects containing cell information to be processed subsequently, based on the containing cell information managed by or stored in information managing part 41. Information managing part 41 stores the number of containing cells which have passed through an operation area of the robot (a pass-through number), and the number of containing cells, among the passing-through containing cells, which have processed or handled by robot 12 controlled by controller 13 having information managing part 41 (a processed number). Information selecting part 42 previously stores a process ratio indicating a ratio of the number of containing cells to be processed by each robot to the number of containing cells which have passed through the operation area of the corresponding robot. Information selecting part 42 checks the cell information of the containing cell positioned at the most downstream side, among the containing cells managed by information managing part 41, receives data of the above pass-through number and processed number from information managing part 41, and compares the data with the predetermined process ratio. As a result of the comparison, information selecting part 42 selects the checked cell information when a process ratio, after the checked cell information is processed, is judged not to exceed the predetermined process ratio. On the other hand, when the process ratio, after the checked cell information is processed, is judged to exceed the predetermined process ratio, information selecting part 42 checks the cell information of the containing cell positioned at the second most downstream side, and compares the data with the predetermined process ratio as described above.

In the next step S201, information selecting part 42 checks the containing state of the containing cell corresponding to the selected cell information, and transmits the cell information to task executing part 43 only when an article is not contained in the corresponding cell, in order to contain an article in the containing cell (step S202). Task executing part 43 controls robot 12 so that the robot locates an article in the selected containing cell based on the containing cell information.

When the containing work of the robot is completed, information managing part 41 changes the information of the containing state of the corresponding cell, from "uncontained" to "contained."

FIG. 8 is a flowchart showing a procedure which is periodically executed by information managing part 41. First, in step S300, information managing part 41 may determine the amount of movement of the container based on the difference between the current value of the encoder and a value of the encoder just when an input image is captured, and update the current position of each containing cell based on the amount of movement.

In the next step S301, when the current positions of all containing cells of the container are moved outside of a predetermined operation area of the robot (in other words, the container is out of the operation area of the robot), the position or position-orientation of the container, the information indicating the containing state of each cell in the container, and the value of the encoder at the time of capturing the input image (corresponding to the image detecting the container) are transmitted from information managing part 41 of controller 13 to an information managing part 46 of a controller of an adjacent robot on the downstream side (in the embodiment, controller 15) (step S302).

FIG. 9 is a flowchart showing a procedure when the robot controller receives the information regarding the container. First, in step S400, information managing part 46 of controller 15 receives the position or position-orientation of the container, the information indicating the containing state of each cell in the container, and the value of the encoder at the time of capturing the input image from information managing part 41 of controller 13, and then generates containing cell information combining the information of the position or position-orientation of each cell defined by the cell setting part, similarly to information managing part 41 of controller 13 (step S401).

An information selecting part 47 of controller 15 performs a task as explained in FIG. 7, similarly to information selecting part 42 of controller 13. Information selecting part 47 checks one cell information. Then, when it is judged that the process ratio after the checked cell is processed does not exceed a predetermined process ratio (a ratio indicating how many cells, which have passed through the robot operation area, are to be processed), and when an article is not contained in the cell corresponding to the checked cell information, information selecting part 47 transmits the checked cell information to a task executing part 48. Task executing part 48 controls robot 14 so that the robot locates an article in the selected containing cell based on the containing cell information.

In the embodiment, article detecting part 40 is included in controller 13 of the upstream side robot, and container detecting part 45 is included in controller 15 of the downstream side robot. However, article detecting part 40 may be included in controller 15 of the downstream side robot, and container detecting part 45 may be included in controller 13 of the upstream side robot. Otherwise, the both article detecting part 40 and container detecting part 45 may be included in one of the controllers. Otherwise, article detecting part 40 and container detecting part 45 or the like may be arranged separately from the robot controllers. Incidentally, the processing result of article detecting part 40 and container detecting part 45 may be transmitted to information managing part 41 of controller 13.

In the embodiment, the number of the robots is two and the number of the robot controllers for the robots is also two. However, the present invention may be applied to a system including different number of robots and robot controllers. For example, when the number of robots and robot controllers is three, the procedure as explained in FIG. 3 is sequentially executed in the three controllers. Concretely, the information managing part of the most upstream side robot transmits the information to the information managing part of the intermediate robot, an then the information managing part of the intermediate robot transmits the information to the information managing part of the most down stream side robot. As such, beginning at the most upstream side robot, the information is sequentially transmitted to the adjacent robot on the downstream side. In addition, each of article detecting part 40 and container detecting part 45 may be included in one of the robot controllers. For example, when article detecting part 40 is included in controller 13 of the most upstream side robot and container detecting part 45 is included in controller 15 of the most downstream side robot as shown in FIG. 3, the intermediate robot does not need to include any of article detecting part 40 and container detecting part 45. The same may be applied if the number of the robots and robot controllers is equal to or more than four.

In the embodiment, information managing part 41 of controller 13 determines the position or position-orientation of each containing cell at the time when capturing the input image (when detecting the container) based on the information including the position or position-orientation of the container and the position or position-orientation of each containing cell defined in cell setting part 44, and generates the containing cell information. Similarly, information managing part 46 of controller 15 determines the position or position-orientation of each containing cell at the time when capturing the input image (when detecting the container) based on the information including the position or position-orientation of the container and the position or position-orientation of each containing cell defined in cell setting part 49, and generates the containing cell information. Therefore, the information of the position or position-orientation of the container is transmitted from information managing part 41 to information managing part 46.

Figure 10:
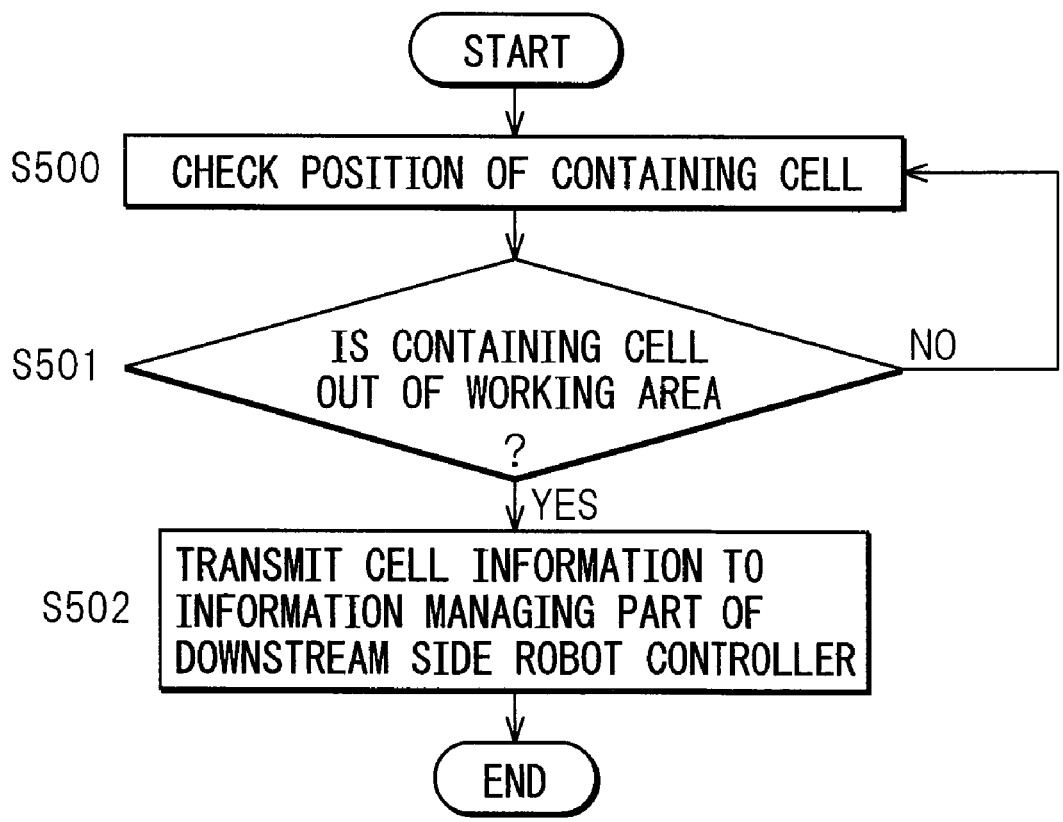
FIG. 10 is a flowchart showing a process regarding transmitting of the containing cell information.

In an alternative embodiment, the containing cell information (including the position or position-orientation of each cell) generated by information managing part 41 may be transmitted to information managing part 46, so that information managing part 46 does not generate the containing cell information based on the position or position-orientation of the container. In this case, information managing part 41 periodically performs a task as shown in FIG. 10, instead of the task as shown in FIG. 8. Concretely, first, in step S500, information managing part 41 updates the current position of the containing cell corresponding to the checked cell information, based on the difference between the value of the encoder at the time when capturing the input image and the current value of the encoder.

Next, when it is judged that the containing cell is moved outside of the predetermined operation area of the robot (step S501), the containing cell information and the value of the encoder at the time when capturing the input image (corresponding to the image detecting the container) are transmitted from information managing part 41 of controller 13 to the information managing part of the robot controller of the adjacent robot on the downstream side (in this case, information managing part 46 of robot controller 15) (step S502). Therefore, the procedure of robot controller 15 when receiving the information of the container, as shown in FIG. 9, is not necessary.

According to the article conveying robot system of the present invention, among a plurality of containing cells in a container, a containing cell in which an article already contained in the previous process may be excluded and an article may be contained in the remaining containing cells. According to the invention, a robot system and another system which does not use a robot may be combined. For example, an operator, positioned on the upstream side of a robot, may locate an article in a containing cell in the container, and the robot may locate another article in the remaining containing cell. Further, each robot controller is connected to each other by means of a communication part, whereby the robot controller may receive the containing cell information, or the information including the position or position-orientation of the container and the containing state, on which the containing cell information is based, from the robot controller of the adjacent robot on the upstream side. Therefore, the downstream side robot cannot locates an article in the containing cell in which another article has already been located by the upstream side robot.

The transmitting part may transmit the containing cell information when a containing cell in relation to the containing cell information is moved outside of a predetermined operation area of the corresponding robot mechanical unit, whereby the information may be transmitted at a preferred timing.

Otherwise, the transmitting part may transmit the information including the position or the position-orientation of the container and the containing state of the article when the container in relation to the information of the position or the position-orientation of the container is moved outside of a predetermined operation area of the corresponding robot mechanical unit, whereby the information may be transmitted at a preferred timing.

The camera and the image processor for processing an image obtained by the camera may be built into the robot controller, or may be arranged separately from the robot controller. In other words, the arrangement of the camera and the image processor may be determined depending on the application and/or the constitution of the robot system.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An article conveying robot system comprising:
   a conveyor adapted to convey a container having a plurality of containing cells where an article is positioned;
   a plurality of robot mechanical units positioned along a conveying direction of the conveyor;
   a plurality of robot controllers connected to each other by a communication part, each robot controller adapted to control respective robot mechanical unit; and
   a sensor positioned on the upstream side of the conveying direction of the conveyor relative to a robot mechanical unit on the most upstream side of the conveying direction, the sensor adapted to detect the position or position-orientation of the container conveyed by the conveyor and a containing state of the article in the container, the robot controller being adapted to activate the robot mechanical unit based on the detection result of the sensor so as to locate the article in the container,
   wherein:
      at least a robot controller corresponding to the robot mechanical unit on the most upstream side, among the plurality of robot mechanical units, comprises an information managing part adapted to previously store the position or the position-orientation of each containing cell in the container, adapted to calculate containing cell information including the position or the position-orientation of each containing cell relative to the conveyor and the containing state of each containing cell, based on the stored position or position-orientation of the plurality of containing cells in the container, the position or the position-orientation of the container obtained by the sensor, and the containing state of the article, and adapted to update information regarding the containing state of the containing cell when the corresponding robot mechanical unit has located an article in the containing cell,
      a robot controller corresponding to the robot mechanical unit other than the robot mechanical unit on the most upstream side comprises a receiving part adapted to receive the containing cell information from a robot controller of an adjacent robot mechanical unit on the upstream side, via the communication part, in synchronization with the conveying motion of the conveyor,
      a robot controller corresponding to the robot mechanical unit other than the robot mechanical unit on the most downstream side comprises a transmitting part adapted to transmit the containing cell information to a robot controller of an adjacent robot mechanical unit on the downstream side, via the communication part, in synchronization with the conveying motion of the conveyor, and
      each robot controller corresponding to each of the plurality of robot mechanical units comprises a controlling part adapted to control respective robot mechanical unit, based on the containing cell information, so as to locate an article in a containing cell in relation to the containing cell information at least when the containing cell is not occupied by an article.

2. An article conveying robot system comprising:
a conveyor adapted to convey a container having a plurality of containing cells where an article is positioned;
a plurality of robot mechanical units positioned along a conveying direction of the conveyor;
a plurality of robot controllers connected to each other by a communication part, each robot controller adapted to control respective robot mechanical unit; and
a sensor positioned on the upstream side of the conveying direction of the conveyor relative to a robot mechanical unit on the most upstream side of the conveying direction, the sensor adapted to detect the position or position-orientation of the container conveyed by the conveyor and a containing state of the article in the container, the robot controller being adapted to activate the robot mechanical unit based on the detection result of the sensor so as to locate the article in the container,
wherein:
each robot controller corresponding to each of the plurality of robot mechanical units comprises an information managing part adapted to previously store the position or the position-orientation of each containing cell in the container, adapted to calculate containing cell information including the position or the position-orientation of each containing cell relative to the conveyor and the containing state of each containing cell, based on the stored position or position-orientation of the plurality of containing cells in the container, the position or the position-orientation of the container obtained by the sensor, and the containing state of the article, and adapted to update information regarding the containing state of the containing cell when the corresponding robot mechanical unit has located an article in the containing cell,
a robot controller corresponding to the robot mechanical unit other than the robot mechanical unit on the most upstream side comprises a receiving part adapted to receive information including the position or the position-orientation of the container and the containing state of the article, from a robot controller of an adjacent robot mechanical unit on the upstream side, via the communication part, in synchronization with the conveying motion of the conveyor,
a robot controller corresponding to the robot mechanical unit other than the robot mechanical unit on the most downstream side comprises a transmitting part adapted to transmit information including the position or the position-orientation of the container and the containing state of the article, to a robot controller of an adjacent robot mechanical unit on the downstream side, via the communication part, in synchronization with the conveying motion of the conveyor, and
each robot controller corresponding to each of the plurality of robot mechanical units comprises a controlling part adapted to calculate containing cell information based on the position or the position-orientation of each containing cell in the container, the position or the position-orientation of the container and the containing state of the article, and control respective robot mechanical unit, based on the containing cell information, so as to locate an article in a containing cell in relation to the containing cell information at least when the containing cell is not occupied by an article.

3. The article conveying robot system as set forth in claim 1, wherein at least each robot controller corresponding to the robot mechanical unit other than the robot mechanical unit on the most downstream side is adapted to predetermine an operation area of the corresponding robot mechanical unit,
and wherein the transmitting part transmits the containing cell information when a containing cell in relation to the containing cell information is moved outside of the predetermined operation area of the corresponding robot mechanical unit.

4. The article conveying robot system as set forth in claim 2, wherein at least each robot controller corresponding to the robot mechanical unit other than the robot mechanical unit on the most downstream side is adapted to predetermine an operation area of the corresponding robot mechanical unit,
and wherein the transmitting part transmits the information including the position or the position-orientation of the container and the containing state of the article when the container in relation to the information of the position or the position-orientation of the container is moved outside of the predetermined operation area of the corresponding robot mechanical unit.

5. The article conveying robot system as set forth in claim 1, wherein the sensor is constituted by a camera and an image processor which processes the image obtained by the camera, the image processor being built into one of the plurality of robot controllers.

6. The article conveying robot system as set forth in claim 2, wherein the sensor is constituted by a camera and an image processor which processes the image obtained by the camera, the image processor being built into one of the plurality of robot controllers.

7. The article conveying robot system as set forth in claim 3, wherein the sensor is constituted by a camera and an image processor which processes the image obtained by the camera, the image processor being built into one of the plurality of robot controllers.

8. The article conveying robot system as set forth in claim 4, wherein the sensor is constituted by a camera and an image processor which processes the image obtained by the camera, the image processor being built into one of the plurality of robot controllers.

9. The article conveying robot system as set forth in claim 1, wherein the sensor is constituted by a camera and an image processor which processes the image obtained by the camera, the image processor being arranged separately from the plurality of robot controllers.

10. The article conveying robot system as set forth in claim 2, wherein the sensor is constituted by a camera and an image processor which processes the image obtained by the camera, the image processor being arranged separately from the plurality of robot controllers.

11. The article conveying robot system as set forth in claim 3, wherein the sensor is constituted by a camera and an image processor which processes the image obtained by the camera, the image processor being arranged separately from the plurality of robot controllers.

12. The article conveying robot system as set forth in claim 4, wherein the sensor is constituted by a camera and an image processor which processes the image obtained by the camera, the image processor being arranged separately from the plurality of robot controllers.

* * * * *